July 29, 1947.     H. N. BAUMANN, JR., ET AL     2,424,645
FUSED ALUMINUM OXIDE ABRASIVE MATERIAL
Filed July 13, 1943
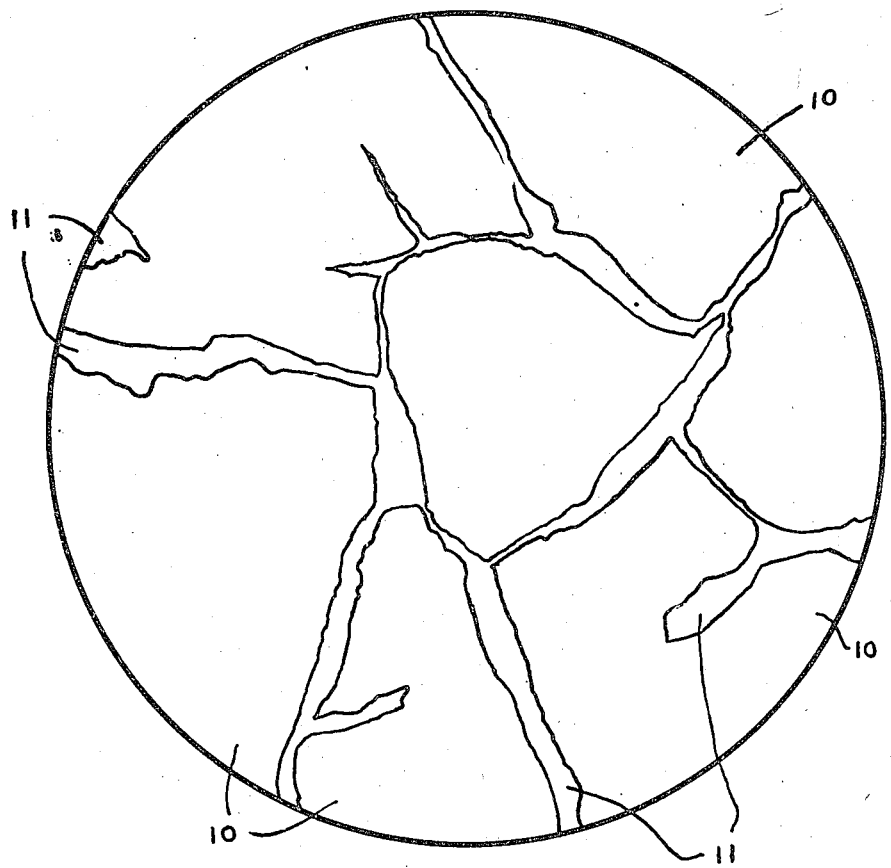
Henry N. Baumann, Jr.
Raymond C. Benner
INVENTORS
BY
ATTORNEY

UNITED STATES PATENT OFFICE 2,424,645

FUSED ALUMINUM OXIDE ABRASIVE MATERIAL

Henry N. Baumann, Jr., and Raymond C. Benner, Niagara Falls, N. Y., assignors to The Carborundum Company, Niagara Falls, N. Y., a corporation of Delaware Application July 13, 1943, Serial No. 494,456

18 Claims. (Cl. 51—309)

This invention relates to abrasive materials which consist essentially of fused alumina. It is an object of our invention to provide such materials in improved form by modifying the composition with small amounts of the oxides of other metals, particularly the oxides of nickel, cobalt and manganese.

Alumina for abrasives has long been made by the fusion of bauxite or such partially purified materials as the white alumina ore obtained by the Bayer process. Alumina derived from such sources is chiefly alpha alumina which is crystallographically identical with the crystalline form of alumina found in nature as corundum though having some differences in other properties. The alumina material formed by the fusion of bauxite, or other somewhat impure natural sources of alumina, contains as minor constituents titanium, silicon and iron and occasionally other elements such as calcium. These constituents are associated with the alpha alumina as included or interstitial impurities usually crystalline in nature but often, at least in part, as glass. On the other hand, alumina produced by fusion of the white alumina ore of the Bayer process is characterized by the absence of any substantial amount of any interstitial or included material and by a mechanically weak structure.

We have found that if oxides of nickel, cobalt or manganese, either alone or as mixtures, are added to the aluminous ore prior to the fusion necessary to produce crystalline alpha alumina, that these oxides combine with some of the alumina during the fusion process to form aluminates which are present in the alumina as interstitial constituents. Such aluminates have the crystalline properties of a spinel and may be regarded as artificial spinels.

In the drawing is shown, highly magnified, the structure of a fusion of cobalt oxide and aluminum oxide produced in accordance with the present invention.

In the case of a number of artificial spinels, it has been found that their hardness increases as the size of the unit cell diminishes so that their hardness is of the same order as that of natural spinel. This is true of the aluminates of nickel, cobalt and manganese, their hardness on the Mohs' scale being between 7.5 and 8, which is quite close to that of natural spinel, which averages about 8, and is rather high since corundum has a hardness of only 9. Another physical property of artificial spinels such as the aluminates of nickel, cobalt and manganese, is a tendency to an octahedral cleavage.

This cleavage is indistinct but it is much greater than any tendency to cleave found in alpha alumina and is of particular advantage in abrasive grain. In commercial applications of abrasive grain, grinding efficiency and rate of grinding are functions of what is called the "break down" of the grain, that is, the manner in which and the extent to which the individual abrasive grains crack and thus expose fresh cutting edges before they are torn from the bond holding them. We have found that abrasive grain made by our method is reasonably tough, but that as it breaks down in service sharp edges are left on the fragments of grain remaining, the sharpness of these edges resulting in rapid cutting. This characteristic property of our new type of grain is due, we believe, to the microstructure of the grain which has been observed to consist of crystalline alpha alumina intergrown with one or more of the aluminates of nickel, cobalt and manganese. It seems probable that the slightly lower hardness and the somewhat greater tendency to cleavage in the aluminate matrix, as compared with the primary crystalline phase (alpha alumina) of the grain, accounts for the distinct and advantageous grinding characteristics of the grain.

Spinel is the name of a mineral having the basic formula $MgAl_2O_4$ or $MgO.Al_2O_3$. Other minerals having the general formula $RO \cdot R'_2O_3$ wherein R is a divalent metal and R' is a trivalent metal are also called spinels. Various metals may unite as oxides in such a combination, the metal being present as R or R' depending upon the valence. It is well known that in some cases multivalent metals may be present both as R and R', the oxide in which the metal is divalent (RO) and the oxide in which the metal is trivalent ($R'_2O_3$) usually being accompanied by other metallic oxides of the same formulae. Where true spinels or the analogous materials also known as spinels are formed synthetically they are known as synthetic or artificial spinels and it is possible to obtain in such products, some which have not, at least up to the present, been found in nature. Nickel, cobalt, and manganese, together with iron, the metals with atomic numbers from 25 to 28, inclusive, are the only metals in the fourth series of the periodic system of the elements which will form a spinel by entering the molecule as a substitute for Mg as a RO forming metal. Unlike nickel, cobalt and manganese, however, iron is not in general suitable for our purpose since there is a strong tendency for iron to form the magnetic oxide $FeO.Fe_2O_3$ rather than to combine with alumina to form the iron spinel $FeO.Al_2O_3$. The magnetic oxide $FeO.Fe_2O_3$ is considerably less hard than spinels, its hardness being approximately 6 on the Mohs' scale and it will be evident that this is a great disadvantage. However, in those cases where $FeO.Al_2O_3$ does form a matrix material with alpha alumina, it constitutes an example of our invention.

It is with the artificial spinels formed with manganese, cobalt and nickel as the RO forming metals and aluminum as the $R'_2O_3$ forming metal that the present application is concerned.

The metals nickel, cobalt, manganese and iron may in part replace each other in the crystalline lattice of a spinel; in other words, nickel, cobalt, manganese and iron aluminates may form solid solutions with each other. There is moreover a tendency for a certain amount of alumina to enter into solid solution in the above-mentioned aluminates with the result that the artificial spinel, when serving as the matrix of abrasive grain, is further hardened and toughened although the matrix itself will always be somewhat softer than the primary constituent of the grain, alpha alumina.

Consequently, the physical properties of alumina abrasive grains in which the aluminates of nickel, cobalt and manganese occur as matrix materials, may be widely varied by varying the proportions of cobalt, nickel and manganese spinels in the matrix and by controlling the amount of alumina in solid solution. As an example, we have found that abrasive grain made by fusion and casting as hereafter described and containing 10% cobalt or manganese oxide with 90% alpha alumina is equal in hardness to the commercial fused alumina grain produced by fusion of the relatively pure alumina ore resulting from the Bayer process.

Other variations in the properties of abrasive grain may be made. For instance, changes in the grinding properties of the grain may be brought about by variations in the toughness and strength of the matrix material as compared to the bond used for the abrasive grain. The abrasive grain produced according to our process may be used for bonded articles, such as wheels and the like, or for flexible backed or coated abrasives such as discs, abrasive paper and cloth, and set-up wheels. In bonded abrasive articles, the customary bonds, i. e. porcelain, resin, rubber, glass and the like, may be used, depending upon the particular characteristics desired in the articles. In flexible backed or coated abrasives, very satisfactory service has been obtained by using glue and various synthetic resin adhesives.

In the practice of our invention the preferred method is to mix the raw ingredients, for example, Bayer process alumina ore and cobalt oxide, thoroughly and to fuse the mixture in an electric arc furnace of any suitable type, though we have found a furnace such as that described in U. S. Patent No. 929,517 to F. J. Tone particularly suitable.

After fusion, the mass may be allowed to cool in the furnace and the resultant pig be broken up to form grain, powders, etc., as is the usual practice in the abrasive industry. The grain produced in this manner is characterized by a coarse, crystalline structure.

In many cases, however, we prefer to pour the fused material from the furnace into a forehearth or mold to form an ingot or other solid mass of comparatively thin cross-section. The more rapid cooling of the material produced in this way results in a reduction of the size of the crystals of the material and a grain is obtained having a distinct and characteristic microstructure in which small crystals of alpha alumina are interlocked with a matrix consisting essentially of artificial spinel.

It is desirable that the crystal diameter be not much over ½ the diameter of the abrasive particles which will be used in forming abrasive articles and the crystal size may even be considerably less. A crystal size of ⅛ of the abrasive particle diameter is satisfactory. Because of the structure and the characteristics of the spinel matrix the abrasive particles do not wear smooth nor do whole granules pull out but rather the abrasive particles crumble away in service to yield a continuously cutting series of fresh crystalline edges. Very rapid cooling by the above described method or other suitable method is necessary to obtain a crystal size as small as about 75 microns, this being approximately the minimum limit.

In some cases we have found by X-ray and petrographic examination that the matrix aluminates in the alumina grain produced by rapid cooling are far from entirely crystallized. However, even in this condition, the glassy matrix may contain considerable alumina in solution. The glassy or crystalline character of the matrix has an important effect upon the crumbling action of the abrasive grain mentioned above. With the rapidly cooled material in which there is a tendency for the matrix to be glassy, it is possible to obtain varying degrees of crystallization of the spinel by annealing or suitable heat treatment. Such heat treatment not only produces devitrification of the amorphous aluminates of the matrix but may also, if the material is subjected to prolonged exposures to high temperatures, cause additional alumina to dissolve in the matrix crystals, thus toughening them. It will thus be seen that by suitable choice of conditions, abrasive grain may be obtained which either contains a glassy, friable matrix or a crystallized, tough matrix around the crystals of alumina as well as a large number of gradations between these extremes. It is possible, therefore, to obtain abrasive articles for various purposes in which the breaking down of the abrasive may be advantageously controlled with regard to the type and characteristics of the bond used.

In the drawing the alumina crystals are designated by the reference character 10 while the spinel matrix is designated by the reference character 11. As will be observed the matrix fills the spaces between the alumina crystals and in some cases intrudes into the crystals, thus firmly uniting them. The nature of the matrix is such however that, as pointed out above, the crystals of alumina may break out and thus provide fresh cutting edges. The efficiencies of abrasive articles utilizing as abrasives the materials of our invention will be much higher than those of abrasive articles using the common abrasives since in the latter there will be more tendency for entire grains to be torn out.

In the practice of our invention, we do not limit ourselves to any particular source of alumina but in general, we prefer the higher grade commercial alumina ores. As sources of the RO forming oxides, we use technical grades of nickel, cobalt and manganese oxides. However, crude ores may be used. The total amounts by weight of nickel, cobalt and manganese oxides found in the final product may be within the limits of about 0.25% to about 15% although we prefer the range from about 0.5% to about 8%.

In the appended claims where the term "spinel" is used, an aluminate of the molecular formula $RO.Al_2O_3$ is meant, R being a metal. By an RO forming metal is meant a metal which forms an oxide in which it is divalent and which oxide will combine with alumina to form a spinel. It will, of course, be recognized that the oxides of several such metals may be combined to form one molecular equivalent signified by RO.

This application is in part a continuation of our copending application Serial No. 312,926, filed January 8, 1940.

We claim:

1. An abrasive fused product comprising crystals of alpha alumina associated in a fused matrix, said matrix consisting essentially of an artificial spinel of the typical formula $RO \cdot R'_2O_3$ in which the $R'_2O_3$ forming metal is aluminum and, the RO forming metal is selected from the group consisting of Mn, Co and Ni.

2. An abrasive fused product comprising crystals of alpha alumina associated in a fused matrix, said matrix consisting essentially of an artificial spinel of the typical formula $RO \cdot R'_2O_3$ in which the $R'_2O_3$ forming metal is aluminum and, the RO forming metal is manganese.

3. An abrasive fused product comprising crystals of alpha alumina associated in a fused matrix, said matrix consisting essentially of an artificial spinel of the typical formula $RO \cdot R'_2O_3$ in which the $R'_2O_3$ forming metal is aluminum and, the RO forming metal is cobalt.

4. An abrasive fused product comprising crystals of alpha alumina associated in a fused matrix, said matrix consisting essentially of an artificial spinel of the typical formula $RO \cdot R'_2O_3$ in which the $R'_2O_3$ forming metal is aluminum and, the RO forming metal is nickel.

5. A fused abrasive product comprising crystals of alpha alumina associated in a matrix, said matrix consisting essentially of an artificial spinel of the typical formula $RO \cdot R'_2O_3$ in which the $R'_2O_3$ forming metal is aluminum and which contains as the RO forming metal therein at least one metal of the group consisting of Mn, Co and Ni.

6. A fused product comprising crystals of alpha alumina associated in a matrix, said matrix consisting essentially of an artificial spinel of the typical formula $RO \cdot R'_2O_3$ in which the $R'_2O_3$ forming metal is aluminum and which contains as an RO forming metal therein at least one metal of the group consisting of Mn, Co and Ni, the artificial spinel containing alumina in solution.

7. An abrasive article comprising binding material and granules of a fused product comprising crystals of alpha alumina associated in a fused matrix, said matrix consisting essentially of an artificial spinel of the typical formula $RO \cdot R'_2O_3$ in which the $R'_2O_3$ forming metal is aluminum and which contains as an RO forming metal therein at least one metal of the group consisting of Mn, Co and Ni.

8. An abrasive article comprising binding material and granules of a fused product comprising crystals of alpha alumina associated in a fused matrix, said matrix consisting essentially of an artificial spinel of the typical formula $RO \cdot R'_2O_3$ in which the $R'_2O_3$ forming metal is aluminum and which contains, as an RO forming metal therein, manganese.

9. An abrasive article comprising binding material and granules of a fused product comprising crystals of alpha alumina associated in a fused matrix, said matrix consisting essentially of an artificial spinel of the typical formula $RO \cdot R'_2O_3$ in which the $R'_2O_3$ forming metal is aluminum and which contains, as an RO forming metal therein, cobalt.

10. An abrasive article comprising binding material and granules of a fused product comprising crystals of alpha alumina associated in a fused matrix, said matrix consisting essentially of an artificial spinel of the typical formula $RO \cdot R'_2O_3$ in which the $R'_2O_3$ forming metal is aluminum and which contains, as an RO forming metal therein, nickel.

11. A fused abrasive product comprising crystals of alpha alumina associated in a matrix, said matrix consisting essentially of an artificial spinel of the typical formula $RO \cdot R'_2O_3$ in which the $R'_2O_3$ forming metal is aluminum and which contains as an RO forming metal therein at least one metal of a group consisting of Mn, Co and Ni, the amount of oxide of RO forming metals present being from about 0.25% to about 15%.

12. A fused abrasive product comprising crystals of alpha alumina associated in a matrix, said matrix consisting essentially of an artificial spinel of the typical formula $RO \cdot R'_2O_3$ in which the $R'_2O_3$ forming metal is aluminum and which contains as an RO forming metal therein at least one metal of the group consisting of Mn, Co and Ni, the amount of oxide of RO forming metals present being from about 0.5% to about 8%.

13. A fused abrasive product comprising crystals of alpha alumina associated in a matrix, said matrix consisting essentially of an artificial spinel of the typical formula $RO \cdot R'_2O_3$ in which the $R'_2O_3$ forming metal is aluminum and which contains as an RO forming metal therein at least one metal of the group consisting of Mn, Co and Ni and being at least partially crystallized.

14. A fused abrasive product comprising crystals of alpha alumina associated in a matrix, said matrix consisting essentially of an artificial spinel of the typical formula $RO \cdot R'_2O_3$ in which the $R'_2O_3$ forming metal is aluminum and which contains as an RO forming metal therein at least one metal of the group consisting of Mn, Co and Ni, the artificial spinel containing alumina in solution and being at least partially crystallized.

15. A fused abrasive grain comprising crystals of alpha alumina associated in a fused matrix, said matrix consisting essentially of an artificial spinel of the typical formula $RO \cdot R'_2O_3$ in which the $R'_2O_3$ forming metal is aluminum and which contains, as an RO forming metal therein, at least one metal of the group consisting of Mn, Co and Ni, the crystals of alumina being of the order of ½ to ⅛ the diameter of the abrasive grain.

16. A fused abrasive grain comprising crystals of alpha alumina associated in a fused matrix, said matrix consisting essentially of an artificial spinel of the typical formula $RO \cdot R'_2O_3$ in which the $R'_2O_3$ forming metal is aluminum and which contains, as an RO forming metal therein, at least one metal of the group consisting of Mn, Co and Ni, said matrix being at least partially crystallized, and the crystals of alumina being of the order of ½ to ⅛ the diameter of the abrasive grain.

17. The process of producing an abrasive product which comprises fusing alumina and an oxide of at least one RO forming metal of the group consisting of Mn, Co and Ni to form a matrix consisting essentially of a spinel of the typical formula RO·R'₂O₃ and having crystals of alpha alumina interspersed therein.

18. The process of producing an abrasive product which comprises fusing alumina and an oxide of at least one RO forming metal of the group consisting of Mn, Co and Ni, quickly cooling the fused mass to obtain crystals of alpha alumina associated in a matrix consisting essentially of an artificial spinel of the typical formula RO·R'₂O₃, crushing the solidified mass to form abrasive grain, and annealing said grain to at least partially crystallize said matrix.

HENRY N. BAUMANN, JR.
RAYMOND C. BENNER.

REFERENCES CITED

The following references are of record in the file of this patent:

UNITED STATES PATENTS

| Number | Name | Date |
|---|---|---|
| 2,279,260 | Benner | Apr. 7, 1942 |
| 1,149,064 | Kalmus | Aug. 3, 1915 |
| 1,161,620 | Coulter | Nov. 23, 1915 |
| 2,152,656 | McDougal et al. | Apr. 4, 1939 |
| 1,075,659 | Mankau | Oct. 14, 1913 |
| 2,339,264 | Heany | Jan. 18, 1944 |
| 2,347,685 | Heany | May 2, 1944 |